Jan. 14, 1964 E. J. DRUAN, JR., ETAL 3,117,717

TAPE PERFORATOR

Filed Nov. 24, 1961 3 Sheets-Sheet 1

*INVENTORS*
ERNEST J. DRUAN, JR.
FRANCOIS R. GRUBER
BY Kenway, Jenney & Hildreth
ATTORNEY

*INVENTORS*
ERNEST J. DRUAN, JR.
FRANCOIS R. GRUBER
BY Kenway, Jenney & Hildreth
ATTORNEYS INVENTORS
ERNEST J. DRUAN, JR.
FRANCOIS R. GRUBER
BY Kenway, Jenney & Hildreth
ATTORNEY

United States Patent Office 3,117,717
Patented Jan. 14, 1964

3,117,717
TAPE PERFORATOR

Ernest J. Druan, Jr., Bedford, and Francois R. Gruber, North Wilmington, Mass., assignors to Automation Research Corporation, Arlington, Mass., a corporation of Massachusetts Filed Nov. 24, 1961, Ser. No. 154,714
7 Claims. (Cl. 234—108)

This invention relates in general to information recording apparatus and in particular to an automatically controlled tape perforator.

The concept of recording information on tape by means of coded perforations punched in the tape is quite old. In fact, this concept is embodied in some of the earliest recording systems. In the older systems, however, the requirements of speed, efficient use of tape and size of equipment were seldom very stringent. In more modern systems, all of these requirements have come to be considered of prime importance. More sophisticated encoding and decoding mechanisms have been developed, and the amount of information stored on a given area of tape has risen a hundredfold. At the same time, available space in many applications has been so drastically reduced, that a compact device is essential. Still other requirements have been imposed such as quieter and more reliable operation.

It is, therefore, a primary object of the present invention to improve information recording apparatus, particularly tape perforating mechanisms.

Another object of this invention is to simplify and reduce the cost of tape perforating devices.

Still another object of this invention is to improve the reliability and quiet the operation of tape perforating machines.

A further object of this invention is the automatic control of the advance of a tape in a tape perforating machine, manual overriding control being available without load on the automatic control.

Among the features of the invention is the incorporation of a group of simple, straight and identical lever linkages between solenoids and perforator punches, all enclosed in a compact container on which is mounted its own source of power. The tape perforating machine also utilizes the punch kickback lever to perform a second function to increase speed of operation. This second function is the actuation of an escapement ratchet to permit instant advancement of the tap being punched. The escapement mechanism is, moreover, provided with a friction drive which minimizes noise of operation and provides more reliable mechanical operation. Although the tape feed mechanism is automatic in nature and responsive to electrical signals, a manual feed knob and coupling are also provided which permit the advance or retraction of tape at any time without disengagement of, or load on, the automatic control. For a better understanding of the present invention together with other objects, advantages and features, reference should be made to the following detailed description which should be read in conjunction with the attached drawings, in which:

Figure 1:
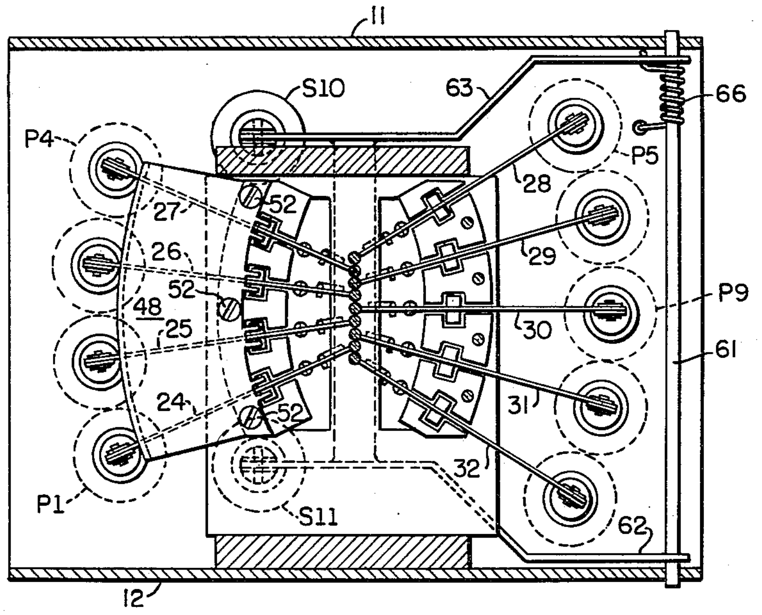
FIG. 1 is a sectional top view of a tape perforator embodying the present invention, showing the disposition and arrangement of lever linkages.
Figure 2:
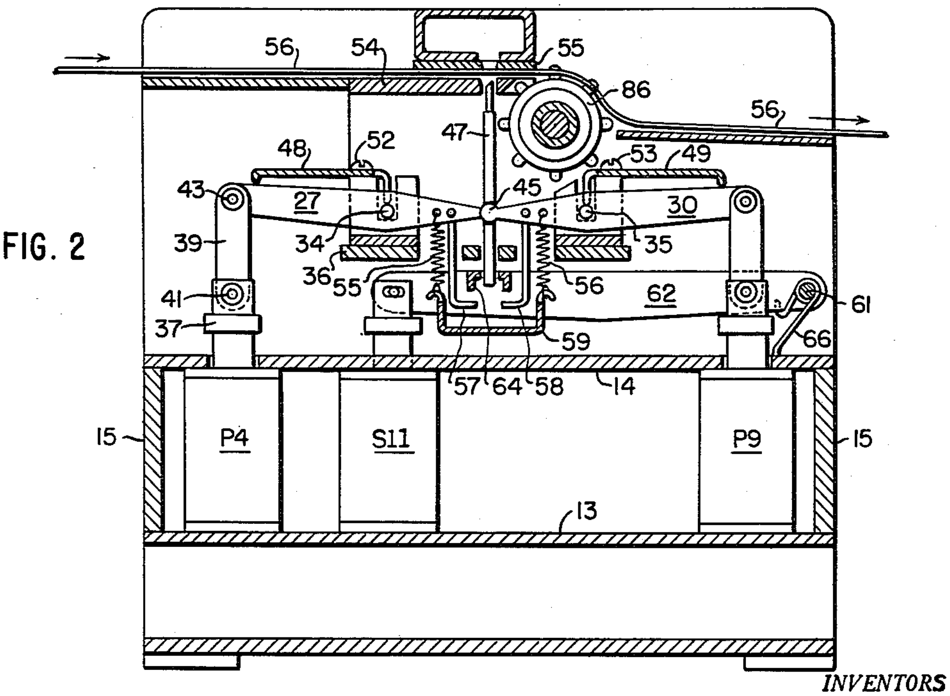
FIG. 2 is a side view, in offset sections, of the embodiment of FIG. 1.

In FIGS. 1 and 2, there may be seen a container which houses the tape perforator. The container includes a pair of side walls 11 and 12 which are, of course, joined to bottom and end members to complete the fixed enclosure. A removable top panel, not shown, is also utilized.

Disposed in the lower portion of the container is a solenoid assembly which includes a frame 13, which may be attached by suitable fasteners to the inner container walls. Another frame 14 may be referred to as the support for the perforating punches and other elements in the upper portion of the container as is explained in greater detail below. In FIG. 2, wall abutments 15 are shown as the element to which the frames are attached and by which they are separated; however, any number of well known mechanical structures are suitable for this purpose.

In FIG. 2, only three solenoids P4, S11, and P9 are visible. The solenoids are mounted upon the lower frame 13 by any suitable mechanical means. Actually, there are nine punch solenoids to operate nine punches and two additional solenoids for punch kickback and tape feed, as explained in greater detail below. All of the solenoids and their associated linkages are partially visible in FIG. 1. The major portion of these linkages is made up of identical straight levers 24 through 32. Four of the linkages are disposed in a fan arrangement at one side of the unit, and five are disposed at the other side. The inner ends of levers 24 through 32 are interdigitated and are very closely spaced to permit perforating of the tape with very close spacing between perforations.

In the typical linkages 27 and 30 as seen in FIG. 2, fulcrums are provided at the points 34 and 35. These fulcrums are supported on a frame member 36, which in turn derives its support from the basic upper frame 14. As is shown relatively clearly in FIG. 1, the fulcrums are, of course, also arranged in fan-shaped arcs. Extending from the solenoid P4 is a plunger shaft 37, to which there is attached a link 39 by means of a pin 41. The upper end of the link 39 is similarly pivotally attached to the lever 27 by means of a pin 43. Similar structure is provided for each of the levers and its corresponding punch solenoid.

The levers are connected at their inner ends to punches by means of additional pivot pins. In a typical case, the lever 30 is connected by means of a pin 45 to a punch 47 which, as is the case for the other eight of the nine punches, is free to slide vertically. Two retainer brackets 48 and 49 are utilized to limit the travel of the various levers when the solenoids are de-energized and the levers are at rest. The two retainer brackets derive their support from the frame member 36 and may be held in position by any conventional means such as the illustrated screws 52 and 53. Each of the brackets is generally fan-shaped and extends across the top surfaces of all of the levers 24 through 27 and 28 through 32. In FIG. 1, for clarity, the bracket 49 is removed.

The connection of the lever 30 to the punch 47 has been described, and it is typical of the connection of each of the levers to its associated punch. The nine punches which are provided are mounted in closely spaced relationship for reciprocating movement in apertures formed in a frame member 54 which may be a part of the container top. A die plate 55 is held in position in alignment with a frame member 54, which in turn is supported from the frame member 36. The tape 56 passes between the frame member 54 and the die plate 55. Above the die plate is a receptacle for containing the material punched from the tape. This member is also supported from the frame member 36. Each of the levers 27 through 32 has an aperture formed at a point between its fulcrum and the pivot which connects it to the punch. In each opening, a spring such as the springs 55 and 56 is anchored. The other end of each spring is attached to a fixed guide bracket 59. Each lever is also provided with a hook preferably made of relatively flexible spring steel wire of the order of 0.010 inch diameter. The hooks 57 and 58 depend from positions adjacent the springs on the lever for purposes further explained below. The guide bracket 59 is supported in fixed position from the frame member 36, and the springs which run from the guide bracket to the various levers are under tension to pull the inner ends of the levers and punches downward, as seen in FIG. 2, when the levers are at their rest position.

Provision is made to kick the punches back positively by means of a shaft 61 mounted across the side walls of the housing adjacent the right-hand end of the unit as seen in FIGS. 1 and 2. Pivoted upon and extending from the shaft 61 is a lever having arms 62 and 63. The arms 62 and 63 are bent inwardly intermediate their length and are pivotally attached to the plunger shafts of similar solenoids, S10 and S11, the solenoid S11 and its connection to the lever arm 62 being clearly visible in FIG. 2.

A slotted bracket 64 extending between the arms 62 and 63 completes the lever. The bracket 64 is arranged to contact the hooks of the punches such as those shown at 57 and 58 to kick the levers 24 through 32 back after completion of a punching operation. Contact with the relatively flexible hooks rather than with the levers themselves cushions shock and lessens wear and tear. Wrapped about the shaft 61 is a torsion spring 66, normally effective to bias the lever upwardly. Actuation of the solenoids S10 and S11 attached to the inner ends of the lever arms 62 and 63 serves to depress those ends and kick the punches back to their rest position.

Figure 3:
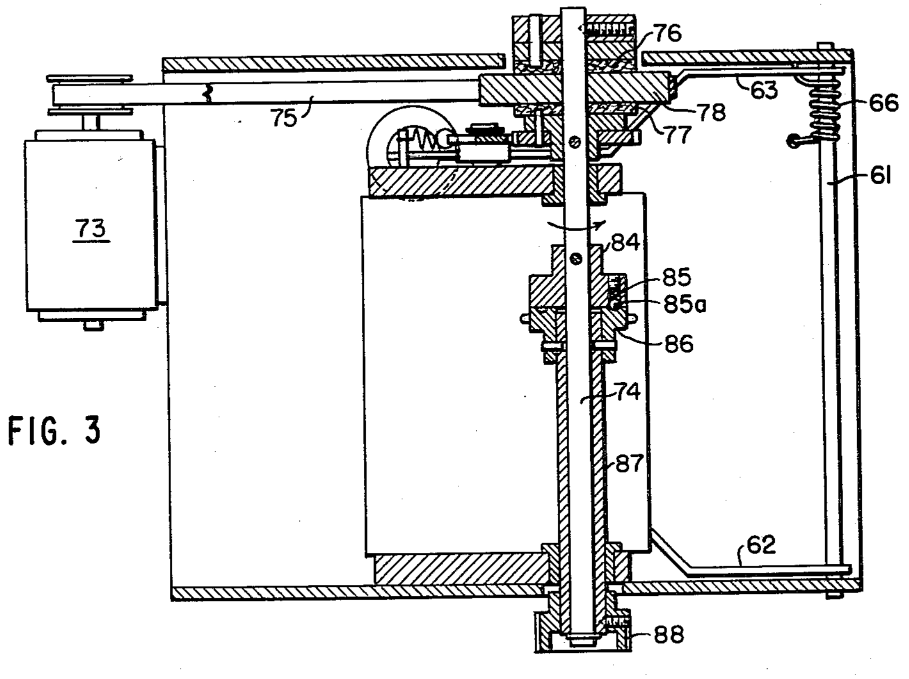
FIG. 3 is a top sectional view of the same embodiment, emphasizing detail on the drive and tape feed mechanism.
Figure 4:
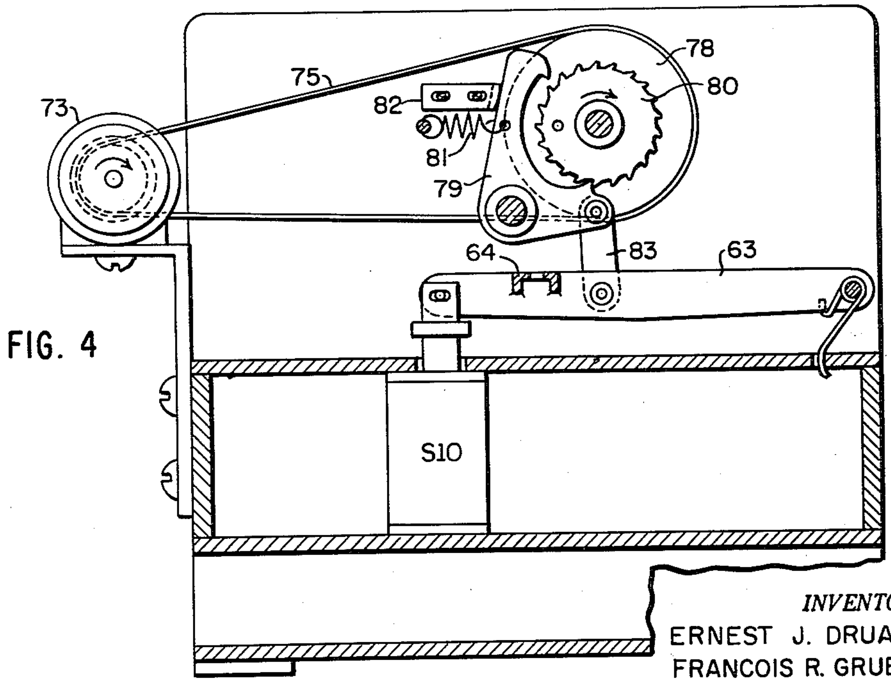
FIG. 4 is a side sectional view of the elements highlighted in FIG. 3.

Details of the drive and feed mechanism may be clearly seen in FIGS. 3 and 4. A motor 73 is mounted on an end wall of the housing and provides constant torque to a slip clutch on a shaft 74 by means of a belt 75. The slip clutch includes a pair of flanges 76 and 77 pinned to the shaft 74. The flanges include friction discs bearing on either side of a free pulley 78 which is driven by the belt 75.

Associated with the inner flange 77 is a ratchet-and-pawl mechanism which includes a pawl 79 pivotally mounted in cooperating relationship with a ratchet 80 which is pinned to the shaft 74. A tension spring 81 normally biases the pawl 79 against an adjustable stop 82. The pawl is connected by a link 83 to the previously mentioned lever 63 which, as noted, functions to kick the punches back after each perforating operation by means of the kick back strip 64 to which it is also connected.

Reverting to the shaft 74, it may be seen that that shaft is mounted in suitable bearings for free rotation and that torque is applied to it through the friction clutch. However, the ratchet-and-pawl mechanism normally prevents such rotation.

There is also mounted in fixed position upon the shaft 74 a detent clutch which includes the flange 84 which accommodates a recessed compression spring 85 and ball 85*a*. A tape feed sprocket 86 which includes a number of suitably spaced detents in the form of hemispherical depressions to accommodate the ball 85*a* is held in close proximity to the flange 84 and is fixedly mounted on a tube 87 which encloses a large portion of the shaft 74. Suitable bearings are provided to permit rotation of the tube 87 relative to the shaft 74 and a knob 88 is provided outside the housing and fixed to the tube 87 to permit manual rotation of the tube and the tape feed sprocket. The interrelationship between the tape feed sprocket and the tape itself is best illustrated in FIG. 2. However, the spacing between teeth of the sprocket has been greatly exaggerated for clarity. An actual working device might have 24 or more teeth on a sprocket of the size shown.

Figure 5:
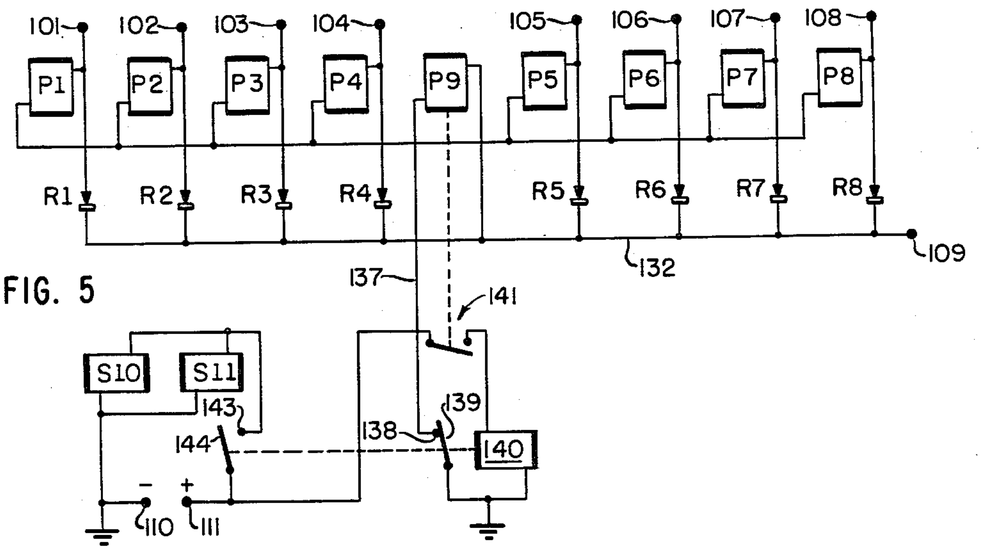
FIG. 5 is a schematic diagram of the electrical control system of the tape perforator.

In FIG. 5, the electrical portion of the invention is schematically illustrated. Eleven terminals are illustrated and these may be so arranged externally of the equipment as to provide convenient electrical access to the various circuit components. Eight terminals, namely 101 to 108, are shown adjacent the top of the diagram and these are connected directly to one terminal of each of the punch solenoids P1 through P8 respectively. The opposite terminals of each of the punch solenoids are directly connected to rectifiers R1 through R8 respectively. A common line 132 connects all of the rectifiers to a solenoid P9 and to a terminal 109. The other terminal of the solenoid P9 is connected in common with the other terminals of the solenoids P1 through P8 by a line 137 to a contact 138 normally closed by one armature 139 of a relay 140. The armature 139 and one end of the coil of the relay 140 are connected to ground. The other end of the coil of the relay 140 is connected through a normally open switch 141 to a terminal 111 to which positive voltage may be applied.

Two additional solenoids S10 and S11 are connected in parallel between a normally open contact 143 of the relay 140 and a negative terminal 110 which may be at ground potential. A second armature 144 of the relay 140 is connected directly to the positive voltage terminal 111.

Figure 6:
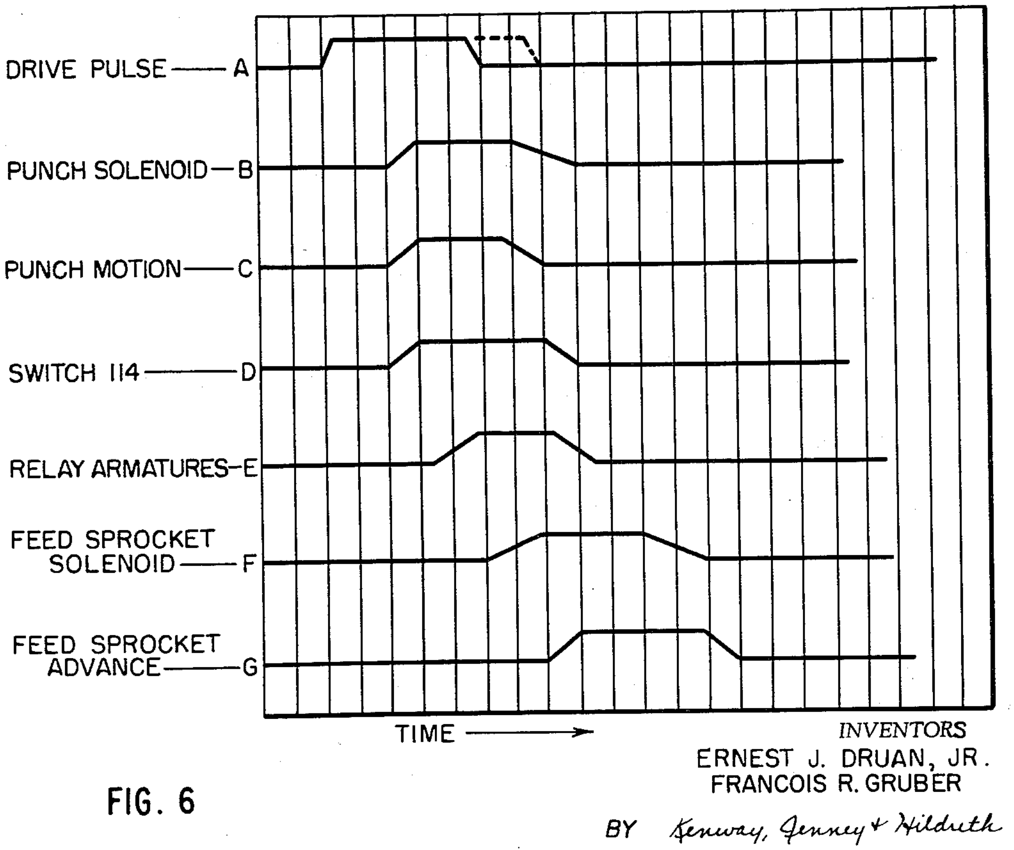
FIG. 6 is a time chart useful in understanding the operation of the invention.

The operation of the invention may be more easily understood by referring to the timing diagram of FIG. 6. Although several pulses may be applied, for purposes of clarity, a single pulse will be considered in the following description. The drive pulse shown at A is sent through one of the terminals 101 through 108, and the punch solenoid of the appropriate punch is energized to effect the perforation of the tape. The flow of current in the solenoid is shown at B.

At the same time that the pulse is applied to the punch solenoids, it is rectified by one of the rectifiers R1 through R8 and applied to the solenoid P9. Alternatively, an independent actuating pulse may be applied to the terminal 109. The solenoid P9, whether directly or indirectly energized, drives a punch which perforates the tape to provide a hole to be utilized by the tape feed sprocket to move the tape. The initiation of punch motion shown at C occurs almost simultaneously with current flow through the solenoid as indicated at B.

When the punch solenoid P9 is energized, it not only perforates the tape, but simultaneously closes the switch 141 as indicated at D. Closing of the switch 141 applies positive voltage to the coil of relay 140.

With energization of the relay 140, the armature 139, as shown at E, swings to open the normally closed contact 138, breaking the circuit between all of the solenoids and ground. At the same time the relay 140 is energized, the normally open contact 143 is closed by the motion of the armature 144, as also indicated at E, to place the voltage supply directly across the solenoids S10 and S11. These solenoids actuate the lever arms 62 and 63, triggering the pawl 79 through the linkage 83 against the resistance offered by the spring 81. This actuates the tape feed sprocket and moves the tape forward by its motion. The timing of current flow through the solenoids S10 and S11 and the advance of the sprocket are indicated at F and G, respectively, of FIG. 6.

The delay between application of the original drive pulse and motion of the feed sprocket to advance the tape is clearly apparent. Only after the punching operation is completely executed is the tape advanced in the manner outlined below.

At the termination of the applied signal, the relay 140 is de-energized as the switch 141 opens with the termination of current through the solenoid P9. The armature 144 swings back to its normally open position, and the armature 139 returns to its normally closed position as the relay coil is de-energized. The reopening of the armature 144 de-energizes the solenoids S10 and S11, and the spring 81 pulls the pawl 79 back against the stop 82. At the same time, the spring 66 applies a rotational force to the shaft 61, raising the lever arms 62 and 63 to a release position.

The rocking action of the pawl 79 permits a tooth of the ratchet to escape, and the ratchet transmits its motion through the shaft 74 on which it is fixed to the detent coupling. The detent coupling then drives the tape feed sprocket to feed the tape forward.

The operation of the perforator is rapid and quiet. The utilization of the punch kickback system to feed tape simplifies and speeds up the operation of the device. The friction drive escapement mechanism, in addition to being quiet, is a highly reliable mechanical component which minimizes the need of maintenance and repair. The coupling between the manual tape advance and the automatic tape advance permits manual tape feed in both directions without disengaging with the automatic feed. Finally, the fan-shaped arrangement of punch linkages permits the use of straight and identical levers and punching with extremely close spacing as well as simplifying and reducing the number of parts.

Although a preferred embodiment of the invention has been shown and described, the invention should not be limited to that embodiment, but only by the spirit and scope of the appended claims.

What is claimed is:

1. In a tape perforating machine having a plurality of punches disposed adjacent a length of tape and arranged for reciprocal motion to perforate said tape and return to a rest position, the combination of a like plurality of punch solenoids, means connecting each of said punch solenoids to one of said punches, means for applying an electrical signal to predetermined ones of said punch solenoids to actuate corresponding ones of said punches to perforate said tape, a tape advance sprocket mounted for rotation adjacent said tape, teeth formed on said sprocket for engaging holes perforated in said tape, a kickback lever for retracting said predetermined ones of said punches after perforation of said tape, a member for periodically mechanically linking said kickback lever to said tape advance sprocket, at least one additional solenoid connected to said kickback lever for actuation thereof, and means responsive to said electrical signal for actuating said additional solenoid to retract said predetermined ones of said punches after perforation of said tape and to rotate said tape advance sprocket to advance said length of tape and present an unperforated portion thereof to said punches.

2. In a tape perforating machine, the combination of a plurality of punches disposed for reciprocating motion adjacent said tape, advance of said punches causing perforation of said tape in preselected areas thereof, a like plurality of punch solenoids, a like plurality of linkages, each said linkage being connected between one of said punches and one of said punch solenoids, said linkages being substantially straight and identical and being disposed in a fan arrangement, the inner ends of said linkages being relatively narrowly spaced and operatively connected to said punches, the outer ends of said linkages being relatively widely spaced and attached to said punch solenoids, a kickback lever disposed adjacent said punches and normally spring-biased out of contact therewith, and electrical means for actuating said kickback lever to contact and retract said punches after perforation of said tape.

3. A tape perforating machine comprising a plurality of closely spaced punches arrayed in a line and disposed for reciprocating punching movement, means for retaining a length of tape in position for perforation thereof by said punches, a like plurality of relatively widely spaced punch solenoids, a like plurality of substantially identical and straight links connecting each said punch solenoid mechanically to one of said punches, means for applying an electrical drive pulse to at least two of said punch solenoids to cause perforation of said tape by punches connected thereto, a tape feed sprocket having teeth engageable by the perforation made by one of said punches, a kickback lever for retracting said punches, at least an additional solenoid, a first link connecting said kickback lever to said additional solenoid, a friction drive device, an escapement mechanism interposed between said tape feed sprocket and said friction drive device, a second link connecting said first link to said escapement mechanism, and means responsive to said electrical drive pulse for energizing said additional solenoid whereby said punches are retracted by said kickback lever and said escapement mechanism is actuated to permit limited rotation of said tape feed sprocket to advance said length of tape and present an unperforated area thereof to said punches.

4. Apparatus as defined in claim 3 wherein said friction drive device comprises a motor, a shaft, a slip clutch fixed to said shaft and driven by said motor, said tape feed sprocket being freely mounted on said shaft, a detent clutch fixed to said shaft adjacent and in operative relationship to said tape feed sprocket, a ratchet-and-pawl mechanism, said ratchet being fixed to said shaft and said pawl being connected to said second link, actuation of said pawl permitting limited rotation of said ratchet and said shaft and of said tape feed sprocket through said detent clutch.

5. Apparatus as defined in claim 4 including a sleeve surrounding said shaft and freely rotatable relative thereto, and a knob fixed to one end of said sleeve, said tape feed sprocket being fixedly attached to said sleeve.

6. A tape perforating machine comprising a plurality of closely spaced punches arrayed in a line and disposed for reciprocating punching movement, means for retaining a length of tape in position for perforation thereof by said punches, a like plurality of relatively widely spaced punch solenoids, a like plurality of substantially identical and straight links connecting each said punch solenoid mechanically to one of said punches, means for applying an electrical drive pulse to at least two of said punch solenoids to cause perforation of said tape by punches connected thereto, a tape feed sprocket having teeth engageable by the perforation made by one of said punches, a kickback lever for retracting said punches, at least an additional solenoid, a first link connecting said kickback lever to said additional solenoid, a friction drive device, an escapement mechanism interposed between said tape feed sprocket and said friction drive device, a second link connecting said first link to said escapement mechanism, a source of voltage for said additional solenoid, a normally open switch interposed electrically between said source of voltage and said additional solenoid, means mechanically connecting said switch to one of said punch solenoids, actuation of said one of said punch solenoids causing said switch to close and voltage to be applied to said additional solenoid whereby said punches are retracted by said kickback lever and said escapement mechanism is actuated to permit limited rotation of said tape feed sprocket to advance said lengths of tape and present an unperforated area thereof to said punches.

7. In a tape perforating machine having a plurality of punches disposed for reciprocating motion and a length of tape disposed for periodic movement adjacent the ends of said punches, advance of said punches causing perforation of said tape, the combination of means for periodically advancing pre-selected ones of said punches in response to first electrical signals, means for retracting said punches in response to second electrical signals, a tape feed sprocket for automatically advancing said tape to present an unperforated portion thereof to said ends of said punches after each retraction thereof, said tape feed sprocket having teeth for engaging perforations in said tape, a source of torque for rotating said tape feed sprocket, said source of torque and said tape feed sprocket being normally disconnected one from another, means for manually advancing said tape relative to said ends of said punches and means for periodically connecting said tape feed sprocket to said source of torque to cause application of torque to and a predetermined amount of rotation of said tape feed sprocket, said lastmentioned means being responsive to third electrical signals.

References Cited in the file of this patent

UNITED STATES PATENTS

| | | |
|---|---|---|
| 1,136,082 | Driscole | Apr. 20, 1915 |
| 2,002,516 | Ackerman | May 28, 1935 |
| 2,377,801 | Mills et al. | June 5, 1945 |
| 3,018,040 | Wales | Jan. 23, 1962 |